US008786599B2

(12) United States Patent
Piergiovanni (10) Patent No.: US 8,786,599 B2
(45) Date of Patent: Jul. 22, 2014

(54) SEGMENTATION OF FREE-FORM SHAPES INTO CHAINS OF CIRCULAR ELEMENTS IN COMPUTER GRAPHICS APPLICATIONS

(75) Inventor: Stefano Piergiovanni, Milan (IT)

(73) Assignee: International Business Machines Corporation, Armonk, NY (US)

( * ) Notice: Subject to any disclaimer, the term of this patent is extended or adjusted under 35 U.S.C. 154(b) by 532 days.

(21) Appl. No.: 13/167,918

(22) Filed: Jun. 24, 2011

(65) Prior Publication Data

US 2012/0069026 A1 Mar. 22, 2012

(30) Foreign Application Priority Data

Jun. 25, 2010 (EP) .................................. 10167276

(51) Int. Cl.
*G06T 15/00* (2011.01)
(52) U.S. Cl.
USPC ............................ 345/419; 382/173; 382/192
(58) Field of Classification Search
None
See application file for complete search history.

(56) References Cited

U.S. PATENT DOCUMENTS

| 6,233,351 | B1 * | 5/2001 | Feeney et al. | 382/155 |
|---|---|---|---|---|
| 7,152,022 | B1 | 12/2006 | Joshi | |
| 7,542,603 | B2 * | 6/2009 | Rosel | 382/173 |
| 2002/0147568 | A1 * | 10/2002 | Wenzel et al. | 702/167 |
| 2005/0281467 | A1 * | 12/2005 | Stahovich | 382/202 |

OTHER PUBLICATIONS

Drysdale, Scot et al., "Algorithms for Complex Shapes with Certified Numerics and Topology", *Information Society Technologies* May 2005, 14 pages.
Yeh, Syh-Shiuh et al., "Implementation of online NURBS curve fitting process on CNC machines", *Springerlink* 2008, 10 pages.
Yoon, Sung H. et al., "Significant Point Detection and Boundary Representation with Lines and Circular Arcs Using a Scanning Box Method", *IEEE Proceedings of South East con apos; 91* 1991, pp. 915-918.

* cited by examiner

*Primary Examiner* — Daniel Hajnik
*Assistant Examiner* — Andrew G Yang
(74) *Attorney, Agent, or Firm* — DeLizio Gilliam, PLLC (57) ABSTRACT

A solution for representing a free-form shape in a data-processing system is proposed. An illustrative method comprises associating sample points defining the free-form shape with a set of circular elements, and storing an indication of the circular elements. Associating includes determining a set of pivot points among the sample points in correspondence of maximum and minimum curvatures of the free-form shape, partitioning the sample points into a set of first groups of sample points each spanning around a corresponding pivot point and a set of second groups of sample points each extending according to a predefined minimum extent between a corresponding pair of adjacent first groups of sample points. Each first group is associated with a first circular element fitting the first group of sample points, and each second group is associated with at least one second circular element providing a predefined continuity with each adjacent first circular element.

20 Claims, 11 Drawing Sheets

SEGMENTATION OF FREE-FORM SHAPES INTO CHAINS OF CIRCULAR ELEMENTS IN COMPUTER GRAPHICS APPLICATIONS

CROSS-REFERENCE TO RELATED APPLICATIONS

The present application hereby claims the benefit of priority under 35 U.S.C. §119 to European Patent Application No. EP 10167276.4, filed on Jun. 25, 2010, entitled, "Segmentation of Free-Form Shapes into Chains of Circular Elements in Computer Graphics Applications" and listing Stefano Piergiovanni as inventor.

BACKGROUND

1. Technical Field

The solution according to one or more embodiments of the present invention relates to the data-processing field. More specifically, this solution relates to computer graphics.

2. Description of Related Art

Computer graphics is a well-established technique for processing (e.g., designing, synthesizing, manipulating and rendering) visual content on computers. Computer graphics techniques are commonly used in a number of applications—such as Computer-Aided Design (CAD), Computer-Aided Manufacturing (CAM), Computer-Aided Engineering (CAE), medical imaging, video games, animation, and the like.

Generally, any image (consisting of an artifact mimicking a physical entity) is represented on a computer by a digital image, which may be either in a raster format (i.e., a matrix of pixels) or in a vector format (i.e., a set of basic graphic elements); the raster format provides greater realistic effects, whereas the vector format provides greater processing flexibility.

With reference in particular to computer graphics based on the vector format, the digital images are represented by models defining their graphic elements. For this purpose, free-form (or general) shapes (i.e., curves and/or surfaces) are commonly represented by models consisting of complex mathematical functions, such as B-splines or NURBSs (Non Uniform Rational Basis Splines), which provide high accuracy and sophistication for processing the corresponding free-form shapes.

However, in some applications it is desirable (or even necessary) to segment the free-form shapes into chains of circular elements approximating them. For example, in CAM applications, standard Computed Numerically Controlled (CNC) machines that are used to manufacture mechanical parts defined by the free-form shapes only recognize linear and circular motion commands; therefore, the free-form shapes have to be segmented into circular elements to machine the corresponding mechanical parts.

In any case, the mathematical functions of the above-mentioned models are quite complex; particularly, a generic spline is a piecewise polynomial function (i.e., it is defined by different polynomials depending on the value of its independent variables). Therefore, the models representing the free-form shapes involve a remarkable memory consumption for their storing (especially when they including a high number of splines); moreover, the evaluation of the mathematical functions of these models (for example, to render the corresponding free-form shapes or to control CNC machines) requires the application of numerical algorithms that are computationally complex and time-consuming.

Some techniques have been proposed in the art for segmenting two-dimensional (2D) free-form shapes—i.e., free-form curves—into chains of circular elements (including straight segments as degenerated circular arcs of infinite radius).

Particularly, U.S. Pat. No. 7,152,022 describes an algorithm to segment a complex curve representing a road into straight segments, circular arcs and clothoid arcs (i.e., portions of spiral curves whose curvature radius varies linearly along them). For this purpose, there is calculated a $\Psi$-s transform of the complex curve (plotting its tangent angles with respect to a fixed line along the complex curve). The $\Psi$-s transform is then fitted by straight segments and parabolic arcs. In this way, each horizontal straight segment, non-zero slope straight segment, and parabolic arc in the $\Psi$-s transform identifies a corresponding straight segment, circular arc and clothoid arc, respectively, in the complex curve. These portions of the complex curve are then used to calculate the curvature radius of each corresponding piece of the road.

"Approximation of Polygonal Curves with Min Number of Circular Arcs—Prototype Software", Scot Drysdale et al., Algorithms for Complex Shapes with Certified Numerics and Topology, May 2005, Information Society Technologies instead discloses an algorithm for approximating an open polygonal curve (defined by a sequence of vertexes) with circular arcs, in order to describe the paths of cutting tools in CAM environments. For this purpose, there is defined a tolerance region (around the polygonal curve) that passes through a gate at each vertex (as defined by a segment centered around the vertex bisecting an angle formed with the adjacent vertices). All the valid circular arcs connecting two vertices (in the tolerance region) are then arranged in a direct graph. The shortest path in this graph from a first vertex to a last vertex determines the desired approximation of the polygonal curve.

Moreover, "Significant point detection and boundary representation with lines and circular arcs using a scanning box method", Sung H. Yoon et al., IEEE Proceedings of South East con apos; 91 discloses an algorithm for representing a boundary curve by circular arcs, which algorithm is based on the detection of significant points of the boundary curve—defined as corner points and inflection points. Particularly, the corner points are detected (unlike other known approaches discussed in this document based on a k-curvature) by rotating the curve and using a scanning box to find its local extremes; the inflection points (wherein a convex arc joints a concave arc) are instead detected by curvature zero-crossing. Each segment between a pair of significant points is then represented with a circular arc by using a Least Mean Square (LMS) fitting method (with each segment providing an error larger than a threshold value that is split to define a new significant point). Similar neighboring circular arcs (in radius and center) are then merged when their difference is negligible. In this way, it is possible to maintain the location of dominant corner points and the length of circular arcs of the original curve.

However, the algorithms known in the art are not completely satisfactory. Indeed, the chain of circular arcs resulting from the segmentation of a generic free-form curve may include a very high number of small circular arcs. Therefore, the model representing the chain of circular arcs may be even more complex than the model representing the free-form curve.

SUMMARY

In its general terms, the solution according to one or more embodiments of the present invention is based on the idea of defining the circular elements according to a curvature variation of the free-form shape to be segmented.

Particularly, one or more aspects of a solution according to specific embodiments of the invention are set out in the independent claims, with advantageous features of the same solution that are set out in the dependent claims.

More specifically, an aspect of a solution according to an embodiment of the invention provides a method for representing a free-form shape (for example, a 2D free-form curve) in a data-processing system. The method includes providing an indication of a plurality of sample points defining the free-form shape (for example, by evaluating mathematical functions of a model representing it). The sample points are then associated with a set of circular elements (i.e., circular arcs and straight segments in the case of the free-form curve). An indication of the circular elements is then stored into a memory of the data-processing system (for example, its mass memory or working memory). According to an embodiment of the invention, associating the sample points with a set of circular elements includes determining a set of pivot points among the sample points in correspondence of maximum and minimum curvatures of the free-form shape (for example, by calculating a curvature radius of each sample point from a circumference passing through the sample point and its adjacent sample points, and then selecting the sample points associated with each relative minimum and each relative maximum of the curvature radius along an ordered sequence of the sample points). The sample points are then partitioned into a set of first groups of sample points and a set of second groups of sample points; each first group of sample points spans around a corresponding pivot point and each second group of sample points extends according to a predefined minimum extent between a corresponding pair of adjacent first groups of sample points. Each first group of sample points is now associated with a first circular element fitting the first group of sample points (for example, by determining an eligible circular arc with an LMS algorithm, and updating the first group of sample points until predefined segmentation constraints are met—such as a maximum distance between the sample points of the first group and the eligible circular arc, its minimum length and its minimum radius). Each second group of sample points is then associated with at least one second circular element providing a predefined continuity with each adjacent first circular element (for example, a single second circular arc if possible or two second circular arcs otherwise being in tangent continuity with the adjacent first circular arcs and meeting the segmentation constraints).

A further aspect of the solution according to an embodiment of the invention provides a software program for implementing this method.

Another aspect of the solution according to an embodiment of the invention provides a data-processing system for performing the same method (for example, a computer).

The same advantageous features (pointed out with reference to the method) apply mutatis mutandis to the software program and to the data-processing system.

BRIEF DESCRIPTION OF THE DRAWINGS

The solution according to one or more embodiments of the invention, as well as further features and the advantages thereof, will be best understood with reference to the following detailed description, given purely by way of a non-restrictive indication, to be read in conjunction with the accompanying drawings (wherein corresponding elements are denoted with equal or similar references and their explanation is not repeated for the sake of brevity, and the name of each entity is generally used to denote both its type and its attributes—such as its value, content and representation—for the sake of simplicity). In this respect, it is expressly intended that the figures are not necessary drawn to scale (with some details that may be exaggerated and/or simplified) and that, unless otherwise indicated, they are merely used to conceptually illustrate the structures and procedures described herein. Particularly.

DETAILED DESCRIPTION

Figure 1:
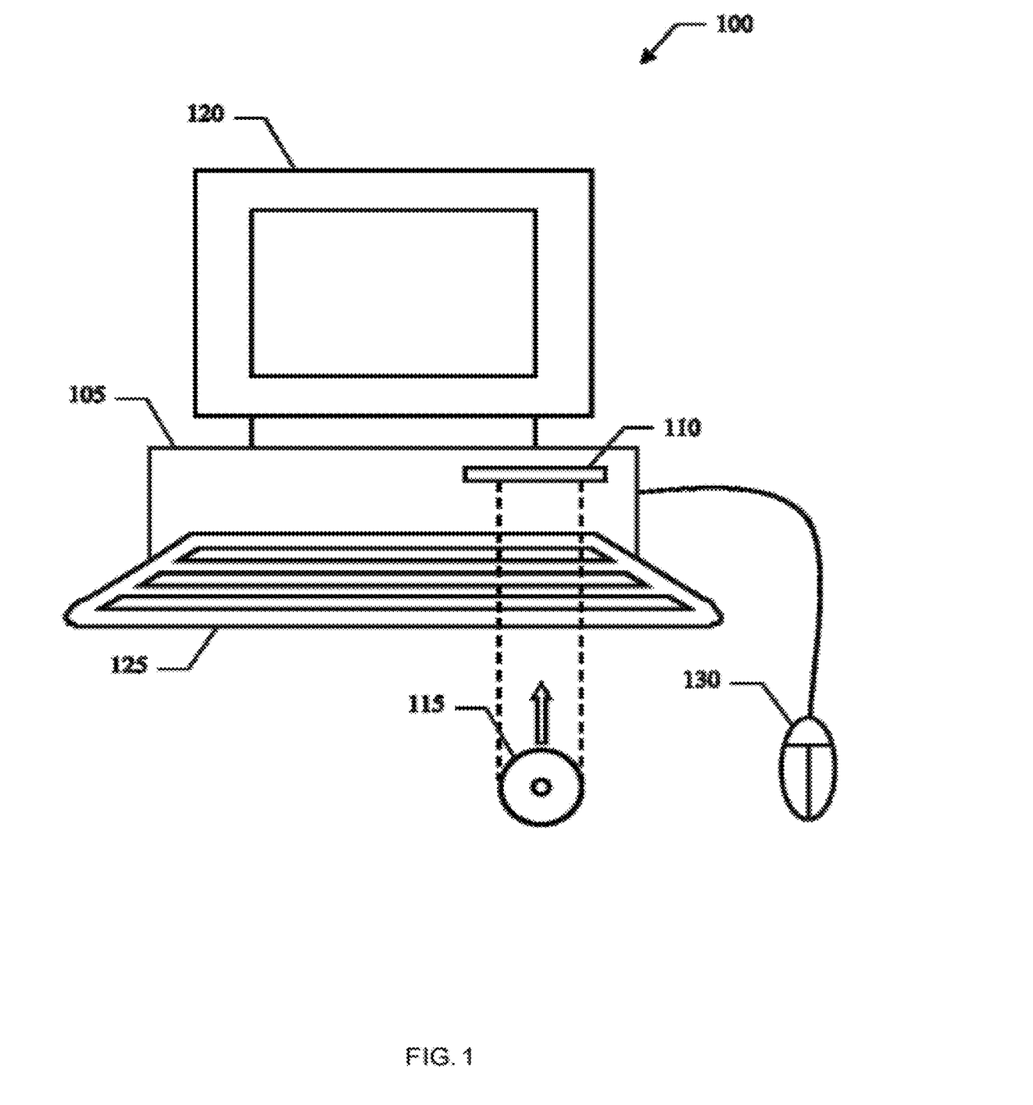
FIG. 1 shows an illustrative representation of a computer that may be used to practice the solution according to an embodiment of the invention.

With reference in particular to FIG. 1, an illustrative representation of a computer 100 that may be used to practice the solution according to an embodiment of the invention is shown. The computer 100 (for example, a PC) is formed by a central unit 105, which houses the electronic circuits controlling its operation; typically, these electronic circuits include a microprocessor, a working memory, drives for any input/output units, a wireless network adapter (for example, of the Wi-Fi type), and the like. The computer 100 is also provided with a hard-disk and a drive 110 for reading CD-ROMs and/or DVD-ROMs 115. A monitor 120 is used to display images on its screen. Operation of the computer 100 is controlled by means of a keyboard 125 and a mouse 130, which are connected to the central unit 105 in a conventional manner.

Figure 2:
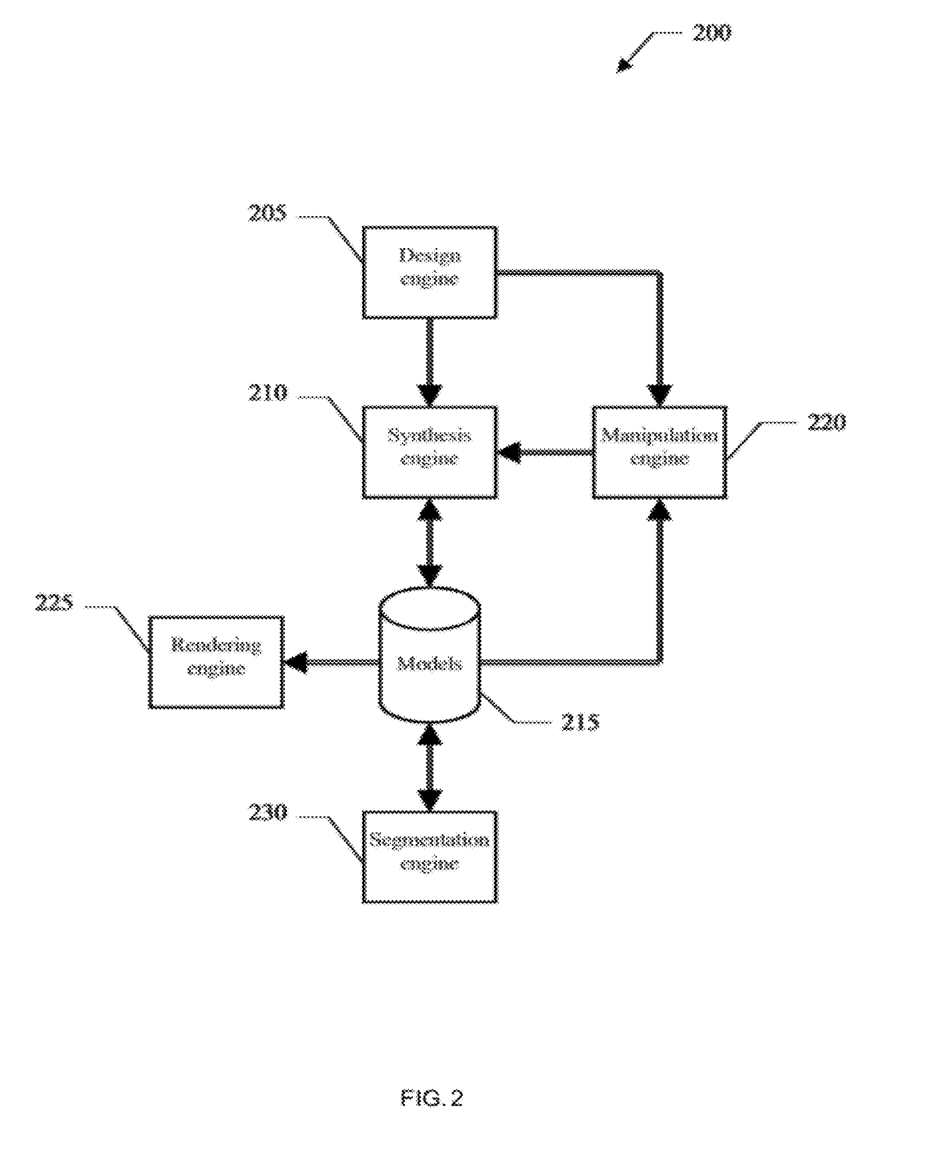
FIG. 2 shows the main software components that may be used to implement the solution according to an embodiment of the invention.

Moving to FIG. 2, the main software components that may be used to implement the solution according to an embodiment of the invention are shown. The information (programs and data) is typically stored on the hard-disk and loaded (at least partially) into the working memory of the computer when the programs are running, together with an operating system and other application programs (not shown in the figure). The programs are initially installed onto the hard disk, for example, from one or more DVD-ROMs.

Particularly, a computer graphics application 200 is installed on the computer (in the following, for the sake of brevity and clarity of exposition, only functional blocks relevant to the solution according to an embodiment of the invention will be introduced and described). The computer graphics application 200 includes a design engine 205, which provides a set of tools for designing digital images formed by any desired (2D) free-form curves (for example, with the mouse). The design engine 205 passes the specification of each free-form curve of a current digital image under design to a synthesis engine 210, which defines the model representing it; generally, each free-form curve is represented by a set of NURBSs; these NURBSs define a chain of basic curves (or patches) that are connected together to form the desired free-form curve. The synthesis engine 210 stores the model representing the digital image (including the parameters defining the NURBSs of its free-form curves) into a database 215. The design engine 205 also controls a manipulation engine 220, which provides a set of tools for updating selected portions of the digital image (for example, to enlarge, shrink, or rotate them). For this purpose, the manipulation engine 220 retrieves the NURBSs representing the selected portion of the digital image from the database 215. The manipulation engine 220 applies a mathematical transformation corresponding to the desired update to these NURBSs and stores the resulting transformed NURBSs into the database 215 (through the synthesis engine 210). At the end, a rendering engine 225 extracts the model of a selected digital image from the database 215, and creates a corresponding graphic for its display (on the monitor of the computer).

In the solution according to an embodiment of the invention, the computer graphics application 200 also includes a segmentation engine 230. As described in detail in the following, the segmentation engine 230 replaces the model of each selected digital image in the database 215 with a simplified version thereof. For this purpose, the segmentation engine 230 segments each free-form curve of the digital image into a chain of circular arcs (including circular arcs degenerated into straight segments of infinite radius); each circular arc is then represented by a corresponding simple analytic function (defined by a few parameters, such as the coordinates of its center, start point and end point).

An exemplary scenario of application of the solution according to an embodiment of the invention is shown in FIG. 3A-FIG. 3F.

Figure 3A:
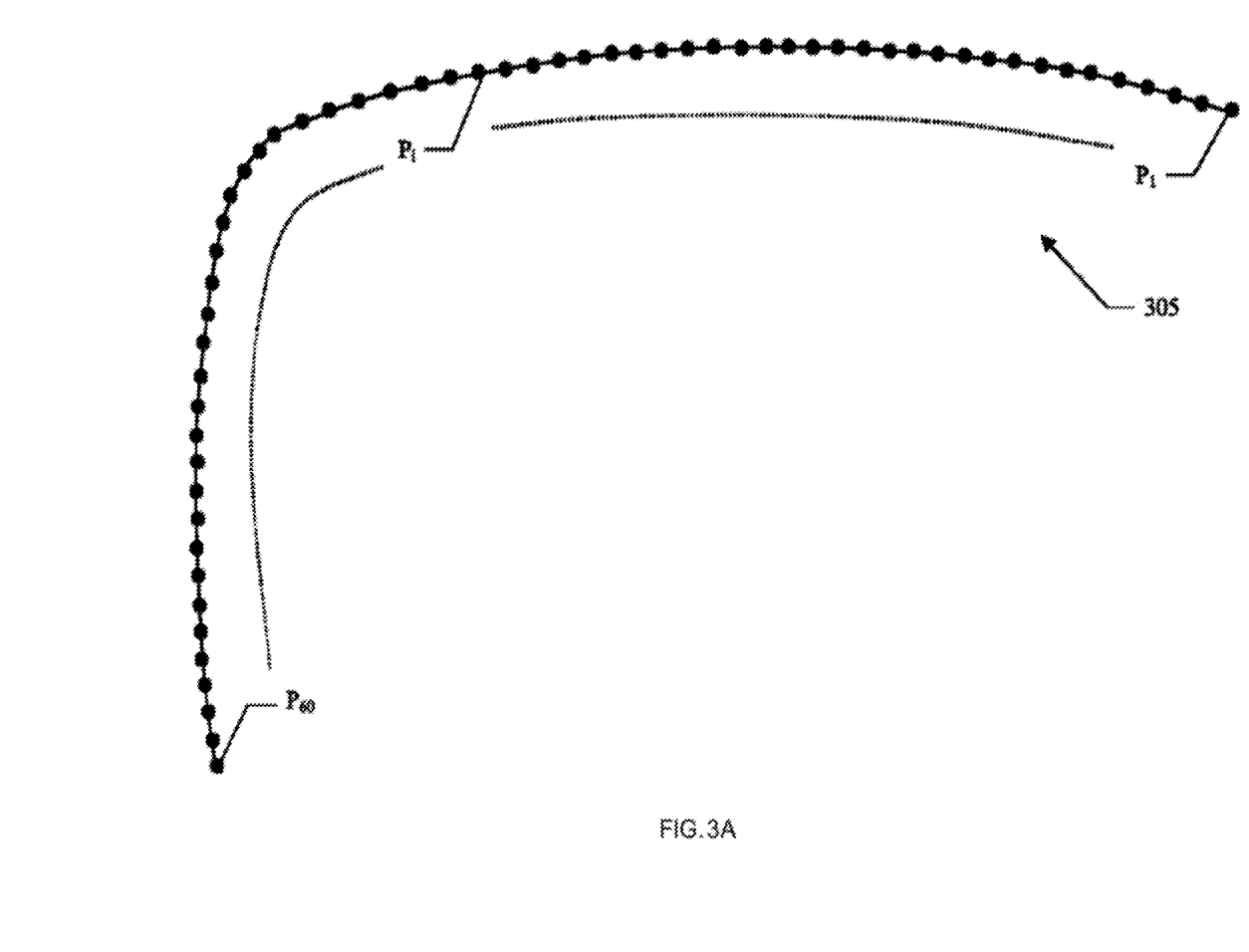
FIG. 3A-FIG. 3F show an exemplary scenario of application of the solution according to an embodiment of the invention.
Figure 3B:
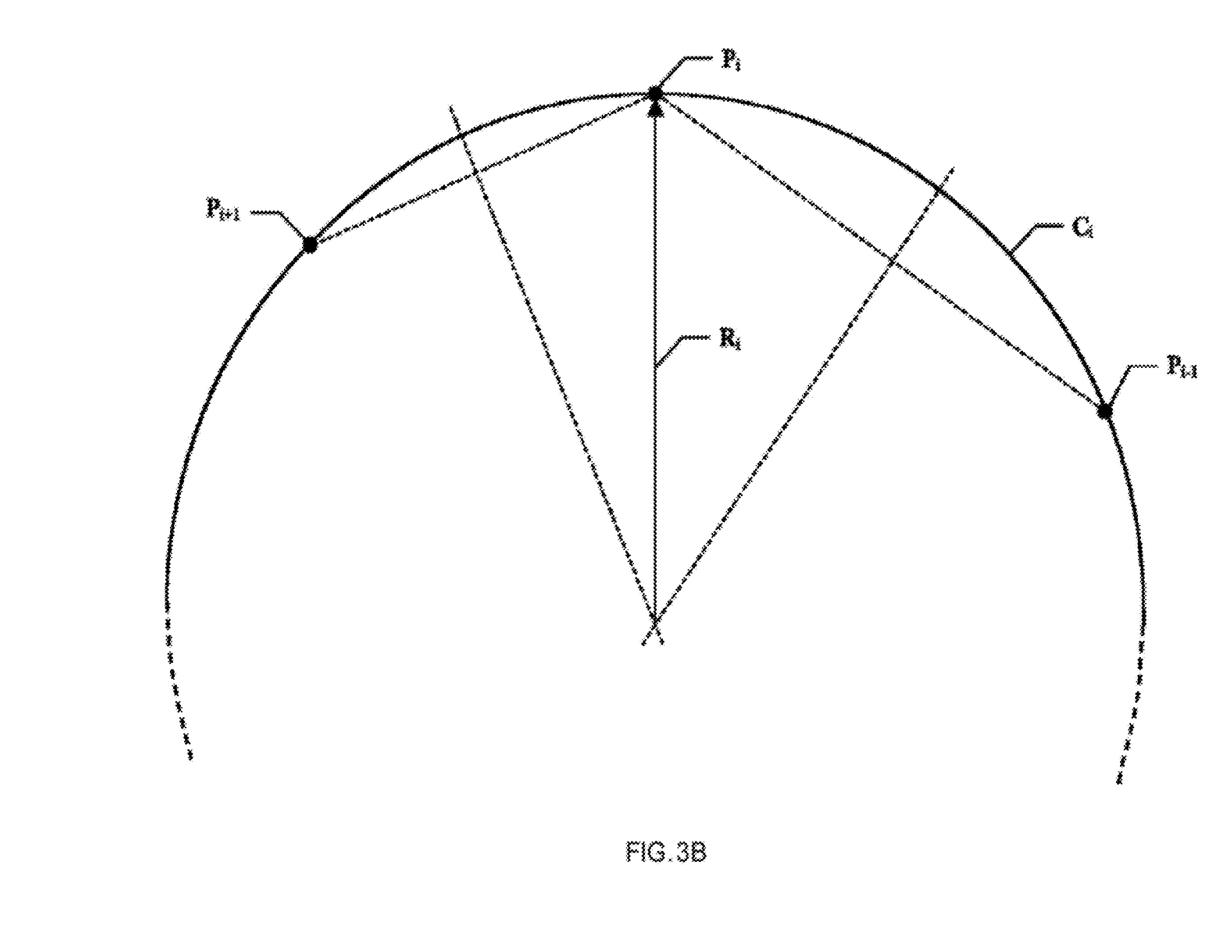

Starting from FIG. 3A, a generic free-form curve 305 to be segmented into a chain of circular arcs is illustrated. First of all, a sequence of sample points $P_i$ are defined by evaluating the NURBSs representing the free-form curve 305 along it (with $i=1\ldots 60$ moving anti-clockwise in the example at issue). The sample points $P_i$ in correspondence of maximum and minimum curvatures of the free-form curve 305 (hereinafter referred to as pivot points $Pv_j$, with j from 1 to the total number of pivots points) are then determined For this purpose, as shown in FIG. 3B, in an embodiment of the invention a circumference $C_i$ is calculated for each sample point $P_i$; the circumference $C_i$ is the unique one that passes through the sample point $P_i$, its preceding sample point $P_{i-1}$, and its subsequent sample point $P_{i+1}$ (along their sequence as defined above). A radius $R_i$ of the circumference $C_i$ then defines an inverse of the curvature of the free-form curve at the sample point $P_i$.

Figure 3C:
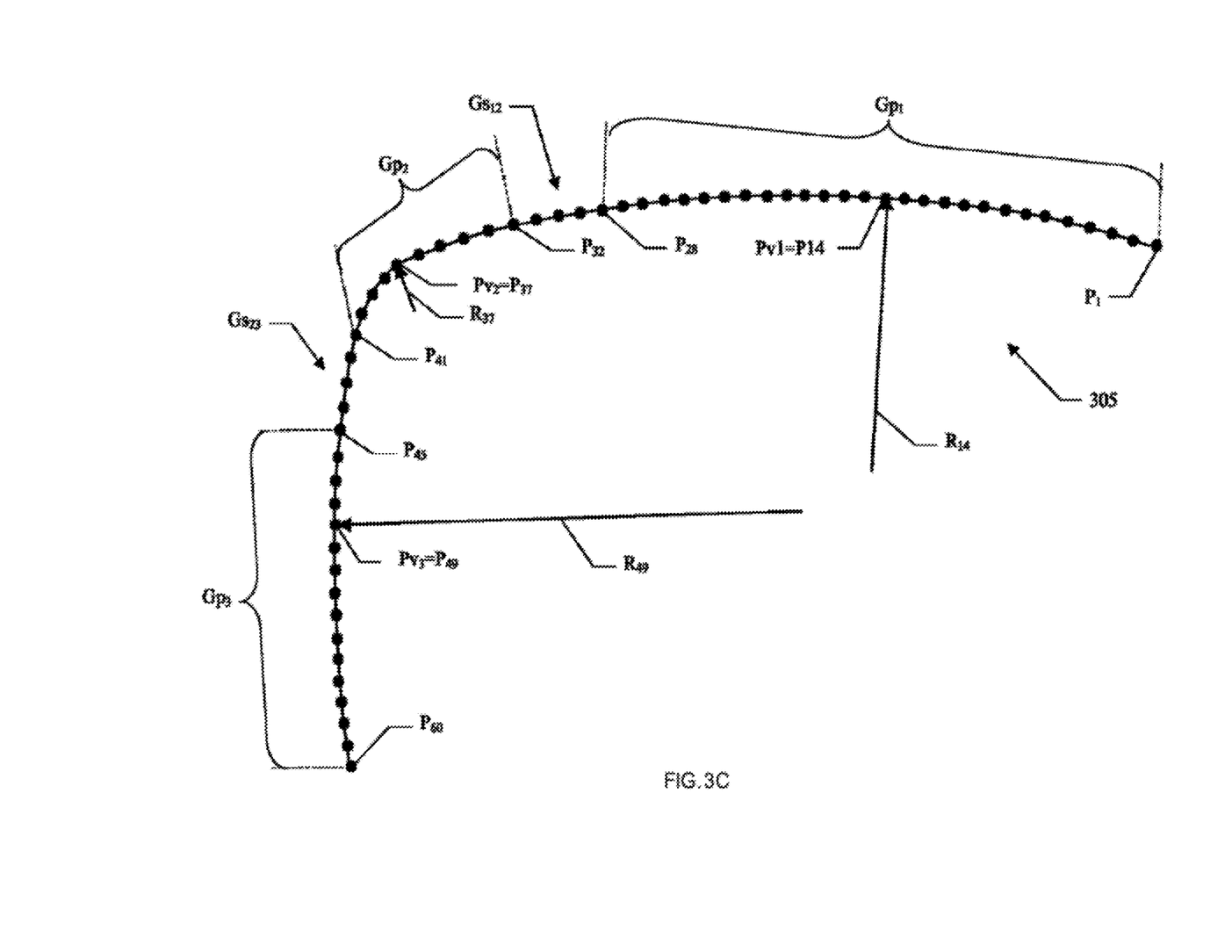

Continuing to FIG. 3C, the pivot points $Pv_j$ are set to the sample points $P_i$ whose radiuses $R_i$ define a relative maximum or a relative minimum along their sequence. For example, if the radiuses $R_i$ have the following values $R_1=68.9$, $R_2=78.9$, $R_3=80.0$, $R_4=92.9$, $R_5=107.9$, $R_6=125.6$, $R_7=146.5$, $R_8=171.8$, $R_9=202.5$, $R_{10}=240.7$, $R_{11}=289.2$, $R_{12}=352.9$, $R_{13}=439.8$, $R_{14}=565.6$, $R_{15}=532.9$, $R_{16}=483.1$, $R_{17}=443.4$, $R_{18}=410.9$, $R_{19}=383.9$, $R_{20}=360.8$, $R_{21}=341.0$, $R_{22}=323.6$, $R_{23}=308.3$, $R_{24}=294.5$, $R_{25}=282.1$, $R_{26}=270.8$, $R_{27}=260.5$, $R_{28}=251.0$, $R_{29}=242.2$, $R_{30}=234.0$, $R_{31}=226.3$, $R_{32}=219.0$, $R_{33}=212.2$, $R_{34}=205.7$, $R_{35}=199.5$, $R_{36}=193.7$, $R_{37}=188.1$, $R_{38}=192.7$, $R_{39}=207.5$, $R_{40}=237.5$, $R_{41}=256.8$, $R_{42}=289.2$, $R_{43}=316.7$, $R_{44}=379.4$, $R_{45}=405.2$, $R_{46}=420.2$, $R_{47}=468.3$, $R_{48}=500.2$, $R_{49}=3,893.6$, $R_{50}=475.6$, $R_{51}=379.6$, $R_{52}=231.8$, $R_{53}=203.7$, $R_{54}=192.8$, $R_{55}=180.3$, $R_{56}=9.3$, $R_{57}=5.8$, $R_{59}=2.9$, $R_{60}=2.6$, the pivot points will be $Pv_1=P_{14}$ (relative maximum radius $R_{14}=565.6$), $Pv_2=P_{37}$ (relative minimum radius $R_{37}=188.1$), and $Pv_3=P_{49}$ (relative maximum radius $R_{49}=3,893.6$).

The sample points $P_1$-$P_{60}$ are then partitioned into a set of primary groups and a set of secondary groups. Each primary group $Gp_j$ spans as far as possible around a corresponding pivot point $Pv_j$; each secondary group $Gs_{hk}$ extends between each pair of adjacent primary groups $Gp_h$ and $Gp_k$ (preceding and following, respectively, the secondary group $Gs_{hk}$ along the sequence of sample points $P_1$-$P_{60}$) with a predefined minimum extent (for example, 3 sample points). As shown in the figure, in this case three primary groups $Gp_1=P_1$-$P_{28}$, $Gp_2=P_{32}$-$P_{41}$, and $Gp_3=P_{45}$-$P_{60}$ are defined for the pivot points $Pv_1$, $Pv_2$, and $Pv_3$, respectively; these primary groups $Gp_1$, $Gp_2$, and $Gp_3$ are separated by corresponding secondary groups $Gs_{12}=P_{29}$-$P_{31}$ (between the primary groups $Gp_1$ and $Gp_2$) and $Gs_{23}=P_{42}$-$P_{44}$ (between the primary groups $Gp_2$ and $Gp_3$).

Figure 3D:
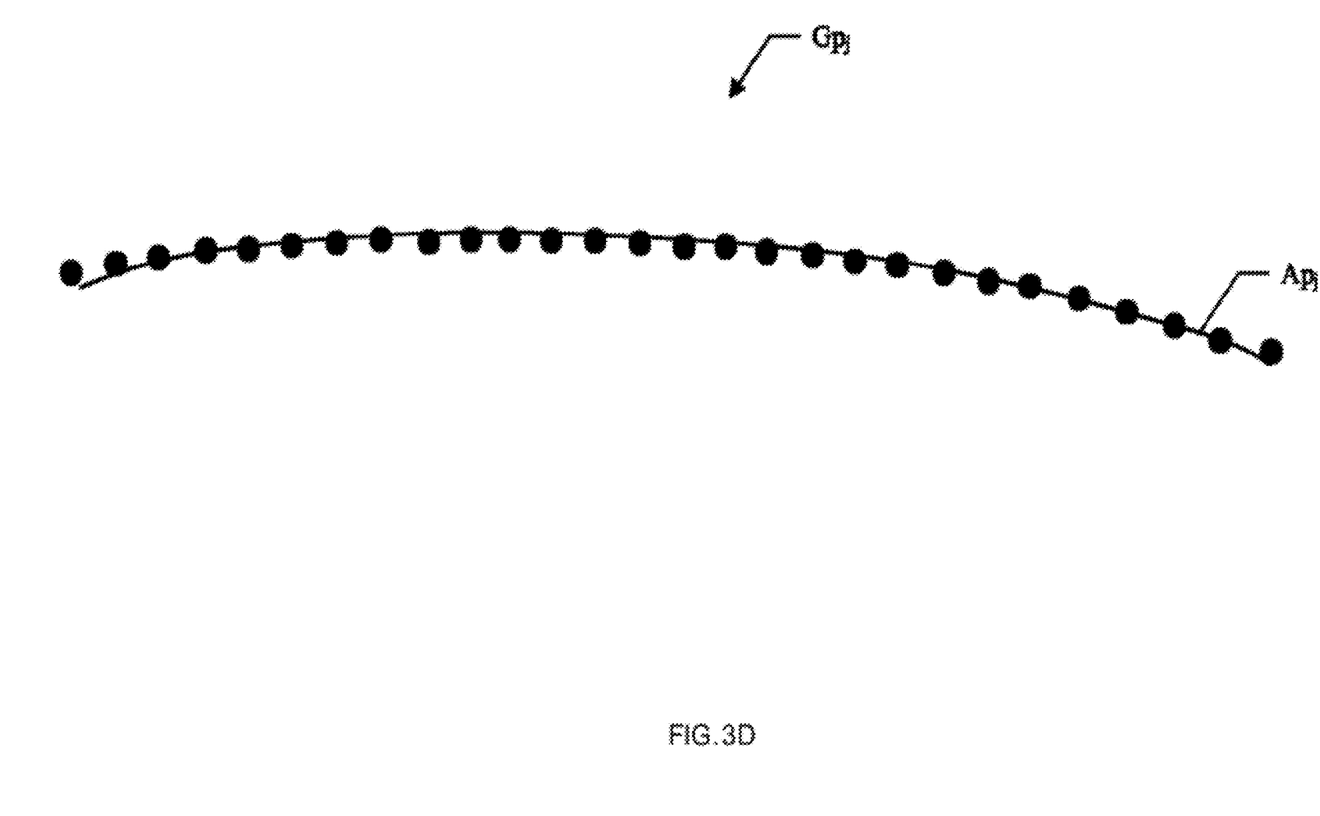

With reference now to FIG. 3D, each primary group $Gp_j$ is associated with a primary (circular) arc $Ap_j$, which approximates the corresponding portion of the free-form curve; for example, as described in detail in the following, the primary arc $Ap_j$ is the one that best fits the sample points of the primary group $Gp_j$, possibly updated until predefined constraints are met (such as a maximum distance between the sample points of the primary group $Gp_j$ and the primary arc $Ap_j$, a minimum length of the primary arc $Ap_j$, and a minimum radius thereof).

At this point, as described in detail in the following, each secondary group $Gs_{hk}$ is associated with one or two secondary (circular) arcs, which approximate the corresponding portion of the free-form curve in continuity with the adjacent primary arcs $Ap_h$ and $Ap_k$.

Figure 3E:
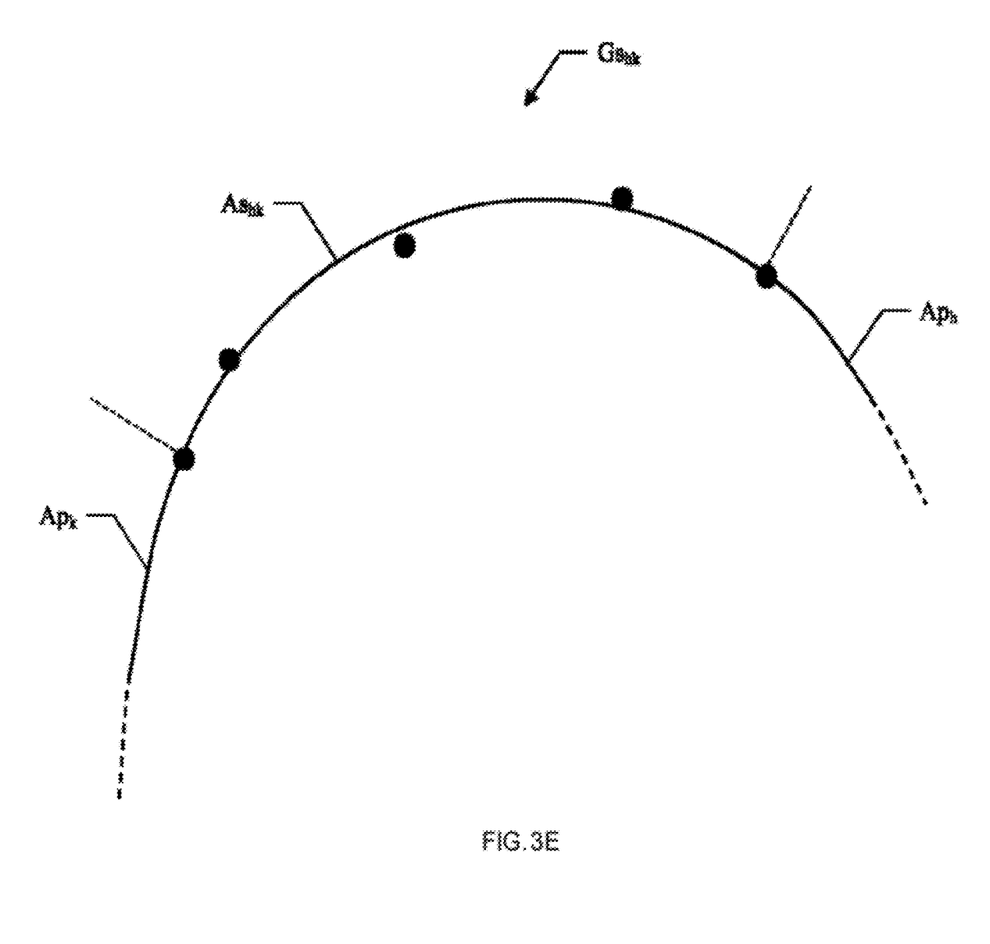
Figure 3F:
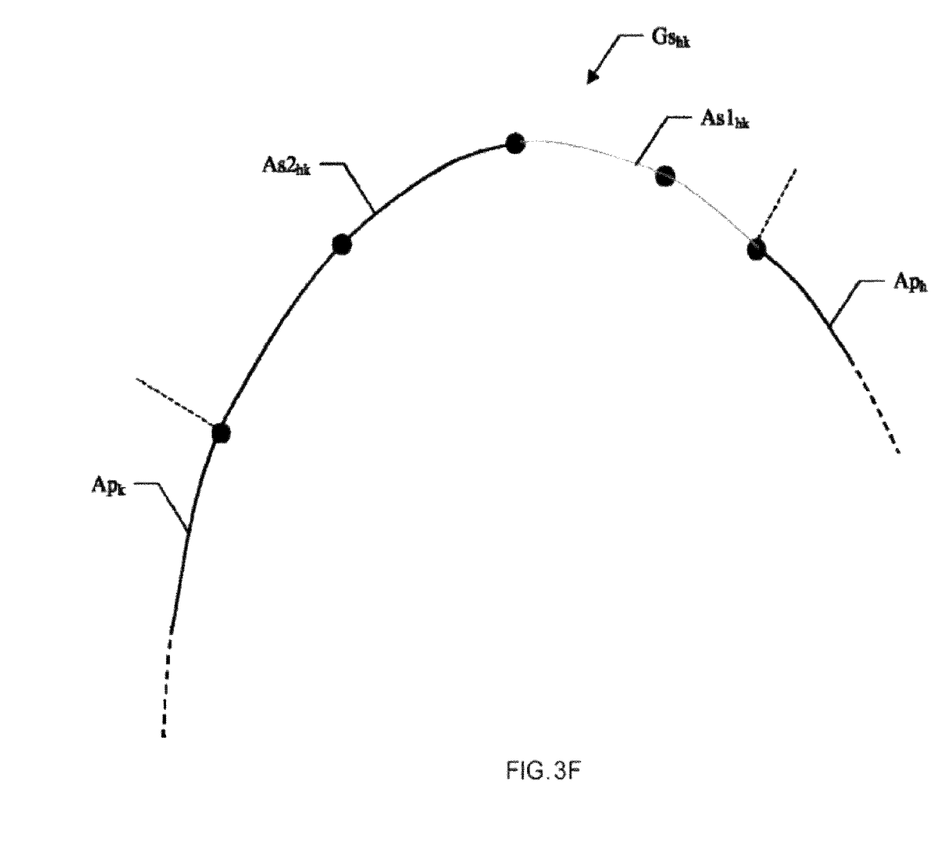

Particularly, as shown in FIG. 3E, if it is possible the secondary group $Gs_{hk}$ is associated with a single secondary arc $As_{hk}$ (between the adjacent primary arcs $Ap_h$ and $Ap_k$). Otherwise, as shown in FIG. 3F, the secondary group $Gs_{hk}$ is associated with two secondary arcs $As1_{hk}$ and $As2_{hk}$ (with the arcs $Ap_h$, $As1_{hk}$, $As2_{hk}$, and $Ap_k$ in continuity).

The proposed solution minimizes (or at least strongly reduces) the number of (primary and secondary) circular arcs that are required to segment the free-form curve. Indeed, the primary groups spanning around the pivot points at the maximum curvatures of the free-form curve identify the portions of the free-form curve that are more suitable to be approximated by long circular arcs. In this way, the free-form curve may be segmented into a chain that is mainly formed by long circular arcs (for these primary groups), with a few shorter circular arcs only for their connection (in correspondence of the other primary groups and of the secondary groups).

All of the above significantly simplifies the model representing the free-form curve; particularly, this reduces a memory consumption for its storing and allows the application of very fast algorithms for its evaluation (such as to render the free-form curve or to control CNC machines).

Figure 4A:
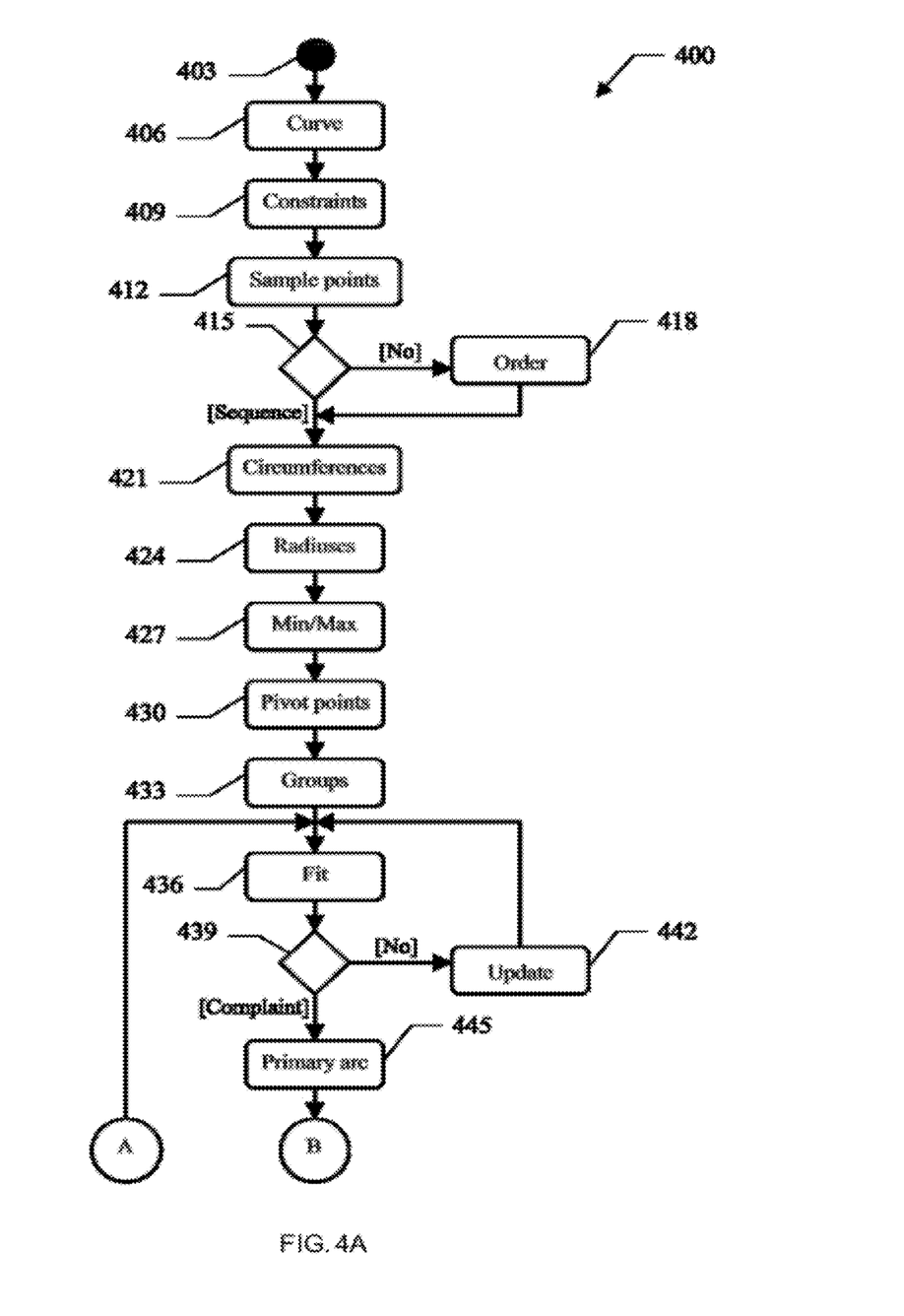
FIG. 4A-FIG. 4B show a diagram describing the flow of activities relating to an implementation of the solution according to an embodiment of the invention.
Figure 4B:
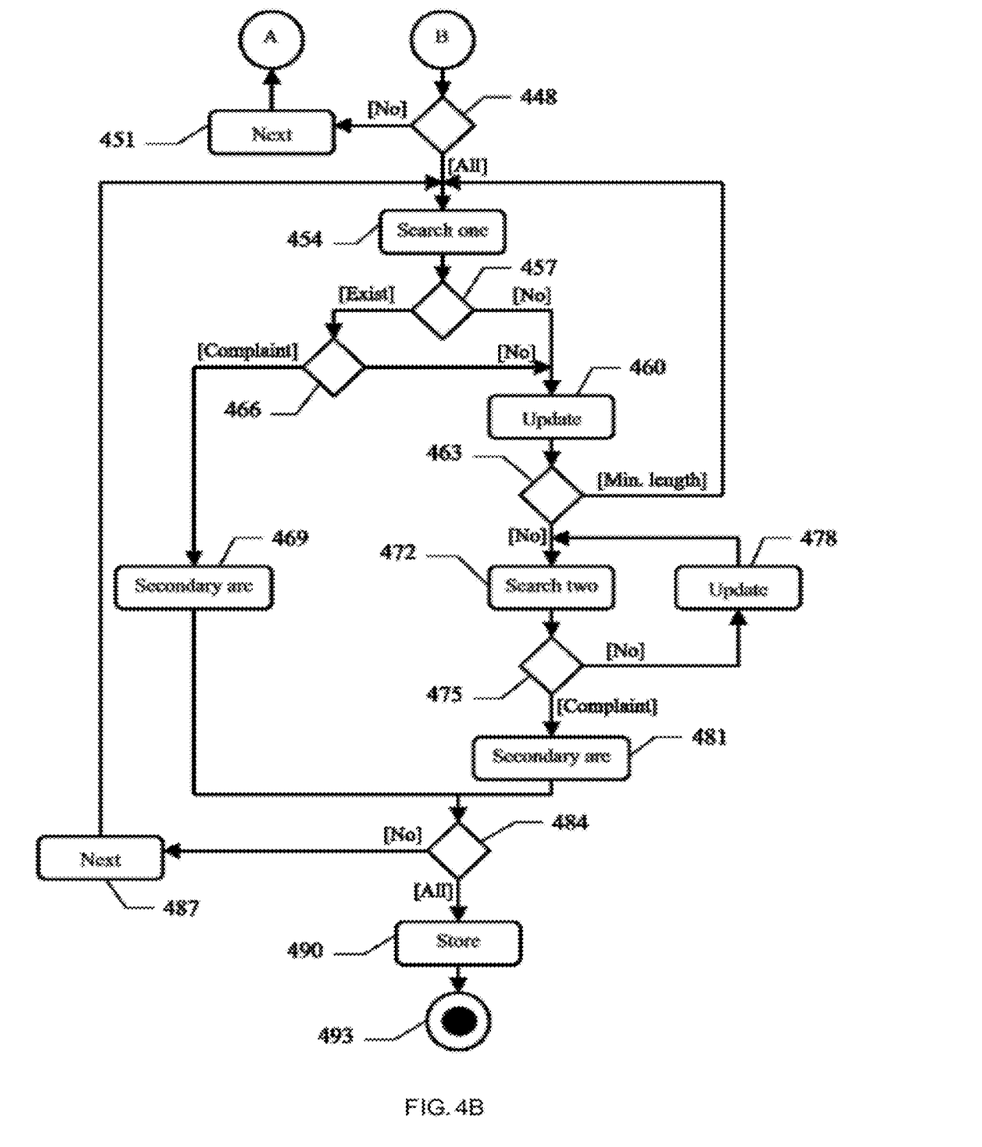

A diagram describing the flow of activities relating to an implementation of the solution according to an embodiment of the invention is shown in FIG. 4A-FIG. 4B.

Particularly, the logic flow of one process embodiment that may be implemented in the above-described system (to segment a free-form curve into a chain of circular arcs) is represented with a method 400, which begins at the black start circle 403. Continuing to block 406, the NURBSs of the model representing a selected free-form curve are retrieved from the corresponding database. The method 400 then passes to block 409, wherein one or more constraints for the segmentation of this free-form curve are provided (for example, by inputting them manually). Typically, these segmentation constraints define a required accuracy of the approximation of the free-form curve by the chain of circular arcs (for example, measured by an allowable maximum distance between the free-form curve and the circular arcs); moreover, the segmentation constraints may define an allowable minimum length of the circular arcs and/or an allowable minimum radius thereof. With reference now to block 412, a set of sample points are calculated for each NURBS; for this purpose, the NURBS is evaluated (for example, utilizing the De Boor's algorithm) with a predefined sampling pitch (for example, corresponding to a distance between each pair of adjacent sample points of the order to 0.5-2 mm). A test is made at block 415 to verify whether the sample points so obtained (for the different NURBSs) are ordered in a sequence along a predefined direction (for example, anti-clockwise). If not, the sample points are re-arranged at block 418 so as to be correctly ordered anti-clockwise. The method 400 then descends into block 421; the same point is also reached from block 415 directly when the sample points are already ordered anti-clockwise.

In any case, for each sample point the circumference passing through the sample point itself, its preceding sample point and its subsequent sample point (along the sequence of sample points) is calculated. When the free-form curve is closed, each sample point thereof is always arranged between two adjacent sample points; conversely, when the free-form curve is open its end sample points (i.e., a first sample point and a last sample point of the sequence) only have a single adjacent sample point (a second sample point and a last-but-one sample point, respectively), so that they are excluded from this computation. Proceeding to block 424, for each sample point (with the exception of the first one and the last one when the free-form curve is open) there is calculated the radius of the corresponding circumference. In this way, there is obtained an indicator of the curvature of the free-form curve at the sample points in a very simple and fast way.

The method 400 continues to block 427, wherein each relative maximum and each relative minimum of the radiuses (along the sequence of sample points) are determined. The sample points associated with the maximum and minimum radiuses are selected as pivot points at block 430.

Passing to block 433, the sample points are then partitioned into a set of primary groups (around the pivot points) and a set of secondary groups (separating each pair of primary groups). For this purpose, the pivot points are processed along the sequence of sample points. For each pivot point associated with a minimum radius, the corresponding primary group is defined; the primary group extends at each side of the pivot point (along the sequence of sample points) by the minimum length, but in any case not beyond a middle point between the pivot point and the corresponding adjacent pivot point (with the primary group that reaches the first sample point or the last sample point when it is the first one or the last one, respectively, along the sequence of sample points). Thereafter, for each pivot point associated with a maximum radius, the corresponding primary group is defined; the primary group extends at each side of the pivot point as far as possible, until reaching a distance from the pivot point equal to the minimum length and then until reaching a distance from the adjacent primary group equal to the minimum length (as above, reaching the first sample point or the last sample point when it is the first one or the last one, respectively, along the sequence of sample points). At this point, the secondary groups are automatically defined by the sample points between each pair of adjacent primary groups (with an extent equal to the minimum length when it is possible).

With reference now to block 436, a loop is executed for each primary group (starting from the first one along the sequence of sample points). In this phase, the primary group is fitted by an eligible (circular) arc. This result is achieved by applying well-known error minimization algorithms. For example, in the LMS algorithm, at each iteration of an optimization process a direction is determined along which a difference between a sum of the squares of the distances between each sample point of the primary group and a current circular arc decreases most rapidly (i.e., the corresponding gradient is the lowest); the circular arc is then updated in this direction for a next iteration of the optimization process, until the difference is smaller than a pre-defined threshold value (with the current circular arc that defines the desired eligible arc). A test is then made at block 439 to verify whether the eligible arc so obtained complies with the segmentation constraints; in the example at issue, there is verified whether the distance between each sample point of the primary group and the eligible arc is lower then the maximum distance, the eligible arc is longer than the minimum length, and its radius is higher than the minimum radius. If one or more of the segmentation constraints are not met, the method 400 passes to block 442, wherein the primary group is reduced (for example, by its last point along the sequence of sample points), and the corresponding adjacent secondary group is increased accordingly. The flow of activity then returns to block 436 to repeat the same operations on the primary group so updated.

As soon as an eligible arc complying with the segmentation constraints is found at block 439, the loop is exited by descending into block 445 (with an error condition, not shown in the figure, that is detected if the eligible arc becomes shorter than the minimum length without complying with the segmentation constraints, since in this case it is not possible to approximate the free-form curve with any chain of circular arcs as desired). At this point, the eligible arc so obtained is associated with the primary group as its primary arc.

A test is now made at block 448 to verify whether all the primary groups have been processed. If not, a next primary group (along the sequence of sample points) is considered at block 451; the method 400 then returns to block 436 to repeat the same operations on the next primary group.

On the contrary, if all the primary groups have been processed, the flow of activity passes from block 448 to block 454, wherein a loop is executed for each secondary group (starting from the first one along the sequence of sample points). In this phase, there is searched an eligible (circular) arc that has a radius comprised between the radiuses of its adjacent primary arcs, and that is both in positional continuity and in tangential continuity with them (i.e., each end of the eligible arc coincides with the corresponding end of the adjacent primary arc, and the tangent vectors at this ends are parallel, respectively). The flow of activity then branches at block 457. If such an eligible arc has not been found, the method 400 passes to block 460; in this case, the adjacent primary arcs are reduced (for example, both of them by the sampling point at the corresponding ends), and the secondary group is increased accordingly (by a sample point at each end thereof in this case). A test is then made at block 463 to verify whether the adjacent primary arcs are longer than the minimum length (to be still complaint with the segmentation constraints). If so, the method 400 returns to block 454 to repeat the same operations on the secondary group so updated. Referring back to block 457, if the eligible arc (in positional and tangential continuity with the adjacent primary arcs) has been found, the method 400 passes to block 466; in this case, a test is made to verify whether the eligible arc so obtained complies with the segmentation constraints (i.e., the distance between each sample point of the secondary group and the eligible arc is lower then the maximum distance and the radius of the eligible arc is higher than the minimum radius—whereas the eligible arc is always longer than the minimum length). If one or more of the segmentation constraints are not met, the method 400 passes to block 460 to execute the same operations described above.

When an eligible arc complying with the segmentation constraints is found at block 466, the loop is exit by descending into block 469; at this point, the eligible arc so obtained is associated with the secondary group as its secondary arc.

With reference again to block 463, when the adjacent primary arcs have become shorter than the minimum length without finding any eligible arc (in positional and tangential continuity with the adjacent primary arcs) that met the segmentation constraints, the flow of activity passes to block 472. In this phase, after restoring the adjacent primary arcs to their original length, there are searched two eligible (circular) arcs that have radiuses comprised between the radiuses of the adjacent primary arcs, and that are both in positional continuity and in tangential continuity between them and with the respective adjacent primary arcs (always possible). A test is then made at block 475 to verify whether the eligible arcs so obtained comply with the segmentation constraints (i.e., if the distance between each sample point of the secondary group and the corresponding eligible arc is lower then the maximum distance, the eligible arcs are longer than the minimum length, and their radiuses are higher than the minimum radius). If one or more of the segmentation constraints are not met, the method 400 passes to block 478, wherein as above the adjacent primary arcs are reduced and the secondary group is increased accordingly. The flow of activity then returns to block 472 to repeat the same operations on the secondary group so updated.

As soon as two eligible circular arcs complying with the segmentation constraints are found at block 475, the loop is exited by descending into block 481 (with an error condition, not shown in the figure, that is detected if one of the adjacent primary arcs becomes shorter than the minimum length without finding any pair of eligible arcs complying with the segmentation constraints, since in this case it is not possible to approximate the free-form curve with any chain of circular arcs as desired). At this point, the eligible arcs so obtained are associated with the secondary group as its secondary arcs.

The block 484 is reached either from block 469 or from block 481 (when the secondary group has been associated with a single secondary arc or with two secondary arcs, respectively). A test is now made to verify whether all the secondary groups have been processed. If not, a next secondary group (along the sequence of sample points) is considered at block 487; the method 400 then returns to block 454 to repeat the same operations on the next secondary group.

On the contrary, the flow of activity passes from block 484 to block 490, wherein a definition of the primary and secondary arcs so obtained is stored as new model of the free-form curve in the database (by replacing its previous model based on the NURBSs). The method 400 then ends at the concentric white/black stop circles 493.

Figure 5:
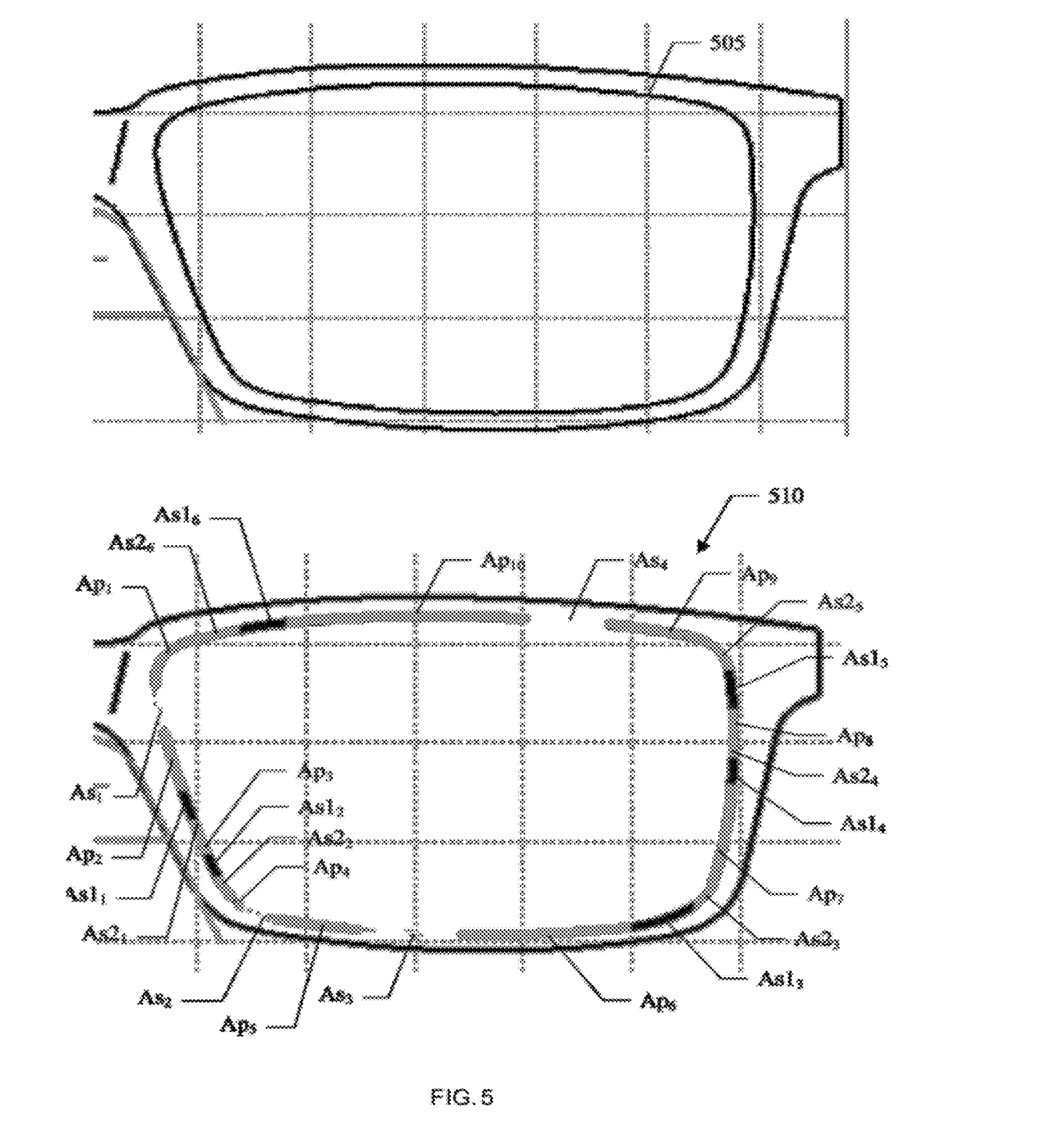
FIG. 5 shows an example of application of the solution according to an embodiment of the invention.

An example of application of the solution according to an embodiment of the invention is shown in FIG. 5.

Particularly, a free-form curve 505 to be segmented into a chain of circular arcs represents an inner edge of a glasses frame. The segmentation constraints are set to a maximum distance of 0.3 mm (between the free-form curve and the circular arcs), a minimum length of 1.5 mm and a minimum radius of 1.5 mm (of the circular arcs).

The application of the above-described algorithm segments the free-form curve 505 into a chain of 26 circular arcs 510, and more particularly 10 primary arcs $Ap_1$-$Ap_{10}$ (gray), 4 single secondary arcs $As_1$-$As_4$ (very light gray), and 6 pairs of secondary arcs $As1_1$, $As2_1$-$As1_6$, $As2_6$ (dark and light gray). The higher distance between these circular arcs 510 and the free-form curve 505 is 0.12 mm (lower than the maximum distance 0.3 mm); the shorter circular arc 510 is 1.56 mm (longer than the minimum length 1.5 mm), and the lower radius of the circular arcs 510 is 3.93 mm (higher than the minimum radius 1.5 mm) Moreover, the circular arcs 510 exhibit no positional discontinuity (<0.01 mm) and no tangential discontinuity (<0.5°).

Naturally, in order to satisfy local and specific requirements, a person skilled in the art may apply to the solution described above many logical and/or physical modifications and alterations. More specifically, although this solution has been described with a certain degree of particularity with reference to one or more embodiments thereof, it should be understood that various omissions, substitutions and changes in the form and details as well as other embodiments are possible (for example, with respect to process parameters, materials, and dimensions). Particularly, different embodiments of the invention may even be practiced without the specific details (such as the numerical examples) set forth in the preceding description to provide a more thorough understanding thereof; conversely, well-known features may have been omitted or simplified in order not to obscure the description with unnecessary particulars. Moreover, it is expressly intended that specific elements and/or method operations described in connection with any embodiment of the disclosed solution may be incorporated in any other embodiment as a matter of general design choice.

For example, the proposed solution lends itself to be implemented with an equivalent method (by using similar operations, removing some operations being non-essential, or adding further optional operations); moreover, the operations may be performed in a different order, concurrently or in an interleaved way (at least in part).

The above-described examples of application of the method are merely illustrative and in no way limitative (with the same solution that may be used in whatever field of the computer graphics in the broadest meaning of the term). Moreover, the storing of the model representing the chain of circular arcs approximating the free-form curve relates to any kind of memory (including the working memory when this model is only used transiently).

Alternatively, the sample points may be partitioned into the primary groups and the secondary groups in a different way (for example, by arranging each secondary group in the middle between each pair of adjacent pivot points).

The possibility of searching the secondary arcs so as to provide a different type of continuity with its adjacent primary arcs is not excluded; for example, each secondary arc and the adjacent primary arcs may also be in curvature continuity (i.e., they have the same radius) or in acceleration continuity (i.e., they have the same rate of radius change); moreover, nothing prevents associating more secondary arcs with each secondary group (when the desired continuity cannot be provided by a lower number thereof).

Even though in the preceding description reference has been made to 2D free-form curves (to be segmented into circular arcs), the extension of the proposed solution to 3D shapes is contemplated.

Any other algorithm may be used to evaluate the mathematical functions of the model representing the free-form curve (for example, the De Casteljau's algorithm, the Clenshaw algorithm, and so on). In any case, the sample points may also be provided directly without the need of evaluating any mathematical function (for example, when a graphical representation of the free-form curve is available).

Alternative procedures may be used to determine the pivot points; for example, in a different embodiment of the invention the sample points are low-pass filtered (so as to take into account only the highest maximum radius when multiple maximum and minimum radiuses fall within a predefined filtering mask); in this way, it is possible to discard pivot points too close to each others that may impair the application of the proposed algorithm (in other words, this removes the effects of very fast variations of the curvature of the free-form curve—for example, being due to noise).

The possibility of calculating a different indicator of curvature of the free-form curve at each sample point (even analytically from the mathematical functions of its model) is not excluded.

Each primary group may be associated with the corresponding primary arc with any other technique (even taking into account the segmentation constraints as well during the fitting procedure).

In any case, whatever optimization algorithm may be used to fit each primary group with the corresponding eligible arc (for example, based on neural networks).

During the iterations of the loop for associating each primary group with its primary arc, whenever the eligible arc being found does not met the segmentation constraints it is possible to update the primary group in any other way (for example, by a different number of sample points, alternatively or simultaneously at both ends thereof, and the like).

Similar considerations apply to the association of each secondary group with the corresponding secondary arcs (particularly, in this case as well it is possible to take into account the segmentation constraints directly during the search of the single secondary arc and/or of the two secondary arcs).

Moreover, the possibility of searching the single secondary arc and the two secondary arcs in a single passage is not excluded.

As above, during the iterations of the loop for associating each secondary group with its single secondary arc or its two secondary arcs, whenever the eligible arc or arcs being found does/do not met the segmentation constraints it is possible to update the adjacent primary arcs in any other way (for example, only one of them alternatively, by a different extent, and the like).

The above-mentioned segmentation constraints are merely illustrative, and they may be replaced by any other condition (down to a single one) or combination thereof (for example, by an allowable maximum value of the mean of the distances between the sample points of each group and the corresponding circular arc).

The proposed solution may be implemented as a stand-alone module, as a plug-in for computer graphics application, or even directly in the computer graphics application itself. It would be readily apparent that it is also possible to deploy the same solution as a service that is accessed through a network (such as in the Internet). In any case, similar considerations apply if the program (which may be used to implement each embodiment of the invention) is structured in a different way, or if additional modules or functions are provided; likewise, the memory structures may be of other types, or may be replaced with equivalent entities (not necessarily consisting of physical storage media). In any case, the program may take any form suitable to be used by any data-processing system or in connection therewith (for example, within a virtual machine); particularly, the program may be in the form of external or resident software, firmware, or microcode (either in object code or in source code—for example, to be compiled or interpreted). Moreover, it is possible to provide the program on any computer-usable medium; the medium can be any element suitable to contain, store, communicate, propagate, or transfer the program. For example, the medium may be of the electronic, magnetic, optical, electromagnetic, infrared, or semiconductor type; examples of such medium are fixed disks (where the program can be pre-loaded), removable disks, tapes, cards, wires, fibers, wireless connections, networks, broadcast waves, and the like. In any case, the solution according to an embodiment of the present invention lends itself to be implemented even with a hardware structure (for example, integrated in a chip of semiconductor material), or with a combination of software and hardware.

Moreover, the computer may have another structure or may include similar elements (such as cache memories temporarily storing the programs or parts thereof); in any case, it is possible to replace the computer with any code execution entity (such as a PDA, a mobile phone, and the like), or with a combination of multiple entities (such as a client-server architecture, a grid computing infrastructure, and the like).

What is claimed is:

1. A method for representing a free-form shape in a data-processing system, the method comprising:
providing an indication of a plurality of sample points defining the free-form shape;
determining a set of pivot points among the plurality of sample points corresponding to maximum and minimum curvatures of the free-form shape,
partitioning the plurality of sample points into a set of first groups of sample points and a set of second groups of sample points, each first group of sample points spanning around a corresponding pivot point and each second group of sample points extending according to a predefined minimum extent between a corresponding pair of adjacent first groups of sample points,
associating each first group of sample points with a first circular element fitting said each first group of sample points, and
associating each second group of sample points with a second circular element providing a predefined continuity with each first circular element adjacent to the second circular element; and
storing an indication of said circular elements into a memory of said data-processing system.

2. The method of claim 1, wherein associating each second group of sample points with the second circular element providing the predefined continuity with each first circular element adjacent to the second circular element comprises:
associating a first of the set of second groups of sample points with the second circular element alone if the second circular element provides a tangent continuity with each first circular element adjacent to the second circular element; and
associating a second of the set of second groups of sample points with the second circular element and a third circular element if the second circular element provides a tangent continuity with each first circular element adjacent to the second circular element.

3. The method of claim 2, wherein the free-form shape is a bi-dimensional free-form curve, and wherein each circular element is a bi-dimensional circular arc.

4. The method of claim 3, wherein providing an indication of a plurality of sample points comprises:
providing a mathematical representation of the free-form curve, and
evaluating the mathematical representation with a predefined pitch along the free-form curve.

5. The method of claim 3, wherein the sample points are ordered in a sequence, and determining a set of pivot points comprises:
calculating an indicator of curvature of the free-form curve at each sample point;

determining each relative maximum and each relative minimum of the indicators of curvature along the sequence; and setting the pivot points to the sample points associated with the relative maximum and to the sample points associated with the relative minimum.

6. The method of claim 5, wherein calculating an indicator of curvature of the free-form curve at each sample point comprises:

calculating a circumference passing through the each sample point and each adjacent sample point along the sequence; and setting the indicator of curvature according to a radius of the circumference.

7. The method of claim 3, wherein associating each first group of sample points with a first circular element comprises:

fitting a first group of sample points by an eligible first circular arc, verifying a compliance of the eligible first circular arc with a set of segmentation constraints, and associating the first group of sample points with the eligible first circular arc in response to a determination that the eligible first circular arc is compliant with the set of segmentation constraints; and otherwise updating the first group of sample points and each second group of sample points adjacent to the first group of sample points.

8. The method of claim 7, wherein fitting the first group of sample points by an eligible first circular arc comprises fitting the first group of sample points by an eligible first circular arc utilizing a least squares algorithm.

9. The method of claim 7, wherein updating the first group of sample points and each second group of sample points adjacent to the first group of sample points comprises:

reducing the first group of sample points by at least one sample point in correspondence of at least one end thereof and increasing each second group of sample points adjacent to the first group of sample points by a corresponding at least one sample point.

10. The method of claim 7, wherein associating the second group of sample points with a single second circular element comprises:

in response to an identification of an eligible second circular arc in tangent continuity with each first circular arc adjacent to the eligible second circular arc verifying a compliance of the eligible second circular arc with the set of segmentation constraints; and associating the second group of sample points with the eligible second circular arc in response to a determination that the eligible second circular arc is compliant with the set segmentation constraints; and otherwise updating at least one adjacent first circular arc.

11. The method of claim 10, wherein associating the second group of sample points with two second circular elements comprises:

identifying two eligible second circular arcs in tangent continuity with each adjacent first circular arc;

verifying a compliance of the two eligible second circular arcs with the set of segmentation constraints; and associating the second group of sample points with the two eligible second circular arcs in response to a determination that the two eligible second circular arcs are compliant with the set of segmentation constraints; and otherwise updating at least one adjacent first circular arc.

12. The method of claim 10, wherein updating at least one adjacent first circular arc comprises:

shortening the at least one adjacent first circular arc by a predefined extent.

13. The method of claim 7, wherein the set of segmentation constraints include data indicating at least two of a maximum distance between each sample point and a corresponding circular arc, a minimum length of the corresponding circular arc, and a minimum radius of corresponding circular arc.

14. A non-transitory computer program product for representing a free-form shape, the computer program product comprising:

a computer readable storage medium having computer usable program code embodied therewith, the computer usable program code comprising a computer usable program code configured to:

provide an indication of a plurality of sample points defining the free-form shape;

determine a set of pivot points among the plurality of sample points corresponding to maximum and minimum curvatures of the free-form shape, partition the plurality of sample points into a set of first groups of sample points and a set of second groups of sample points, each first group of sample points spanning around a corresponding pivot point and each second group of sample points extending according to a predefined minimum extent between a corresponding pair of adjacent first groups of sample points, associate each first group of sample points with a first circular element fitting said each first group of sample points, and associate each second group of sample points with a second circular element providing a predefined continuity with each first circular element adjacent to the second circular element; and store an indication of said circular elements into a memory of said data-processing system.

15. The computer program product of claim 14, wherein the computer usable program code configured to associate each second group of sample points with a second circular element providing a predefined continuity with each first circular element adjacent to the second circular element comprises the computer usable program code configured:

associate a first of the set of second groups of sample points with the second circular element alone if the second circular element provides a tangent continuity with each first circular element adjacent to the second circular element; and associate a second of the set of second groups of sample points with the second circular element and a third circular element if the second circular element provides a tangent continuity with each first circular element adjacent to the second circular element.

16. The computer program product of claim 15, wherein the free-form shape is a bi-dimensional free-form curve, and wherein each circular element is a bi-dimensional circular arc.

17. The computer program product of claim 16, wherein the computer usable program code configured to provide an indication of a plurality of sample points comprises the computer usable program code configured to:

provide a mathematical representation of the free-form curve, and evaluate the mathematical representation with a predefined pitch along the free-form curve.

18. The computer program product of claim 16, wherein the sample points are ordered in a sequence, and the computer usable program code configured to determine a set of pivot points comprises the computer usable program code being configured to:
  calculate an indicator of curvature of the free-form curve at each sample point;
  determine each relative maximum and each relative minimum of the indicators of curvature along the sequence; and
  set the pivot points to the sample points associated with the relative maximum and to the sample points associated with the relative minimum.

19. A data-processing system comprising:
a memory;
a processor, coupled to said memory;
a segmentation engine operable to,
  provide an indication of a plurality of sample points defining the free-form shape;
  determine a set of pivot points among the plurality of sample points corresponding to maximum and minimum curvatures of the free-form shape,
  partition the plurality of sample points into a set of first groups of sample points and a set of second groups of sample points, each first group of sample points spanning around a corresponding pivot point and each second group of sample points extending according to a predefined minimum extent between a corresponding pair of adjacent first groups of sample points,
  associate each first group of sample points with a first circular element fitting said each first group of sample points, and
  associate each second group of sample points with a second circular element providing a predefined continuity with each first circular element adjacent to the second circular element; and
  store an indication of said circular elements into the memory of said data-processing system.

20. The data processing system of claim 19, wherein the segmentation engine operable to associate each second group of sample points with a second circular element providing a predefined continuity with each first circular element adjacent to the second circular element comprises the segmentation engine being operable to:
  associate a first of the set of second groups of sample points with the second circular element alone if the second circular element provides a tangent continuity with each first circular element adjacent to the second circular element; and
  associate a second of the set of second groups of sample points with the second circular element and a third circular element if the second circular element provides a tangent continuity with each first circular element adjacent to the second circular element.

* * * * *